July 3, 1928. 1,675,340
H. S. GANO
THERMAL REGULATOR
Filed Jan. 16, 1924 3 Sheets-Sheet 3
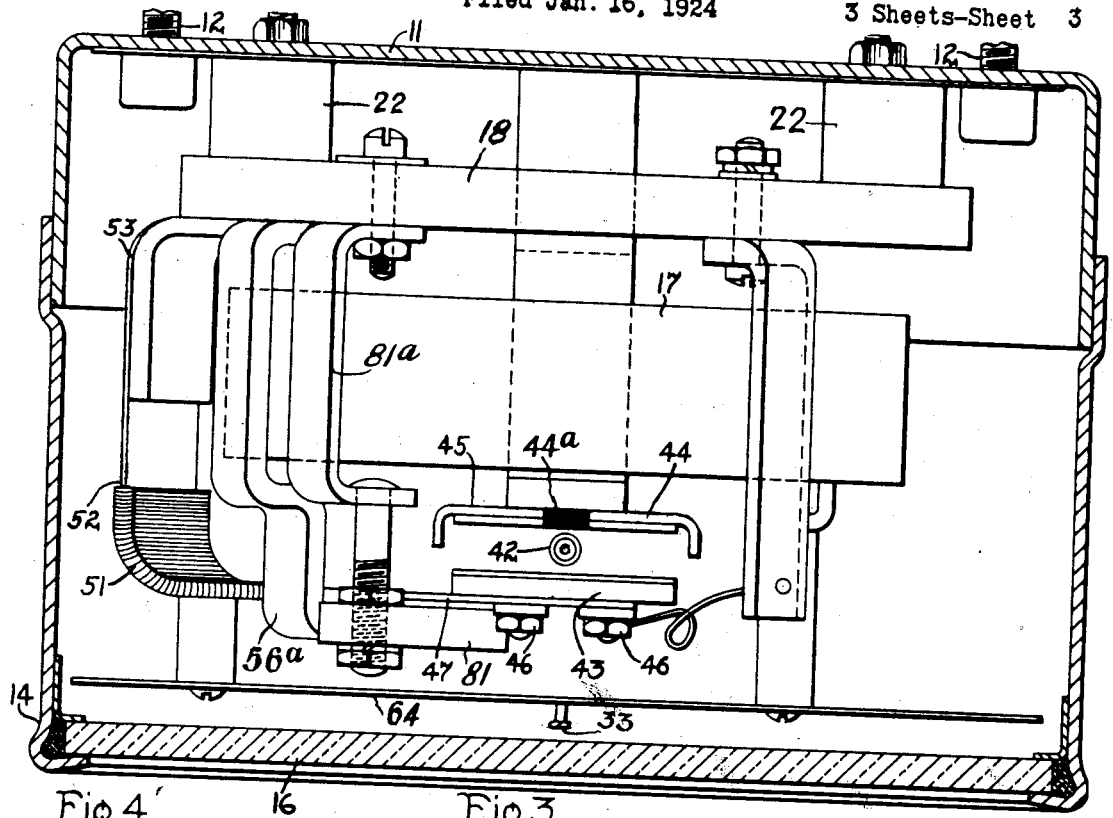
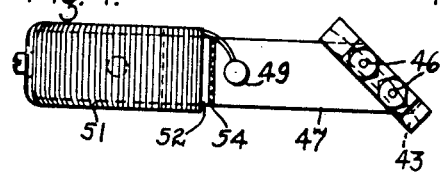
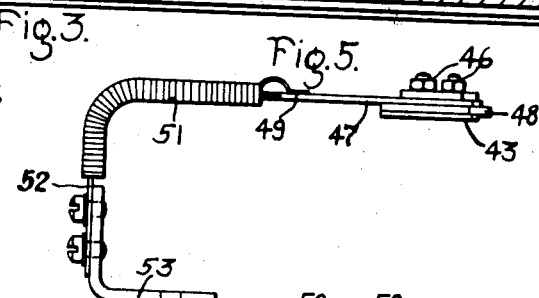
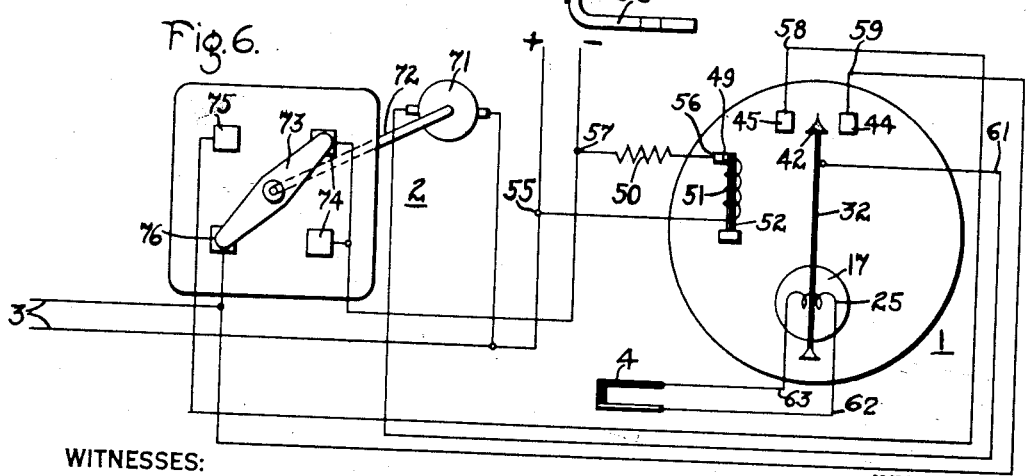
WITNESSES:
R. J. Butler
Lester G. Budlong
INVENTOR
Harlan S. Gano.
BY
Wesley G. Carr
ATTORNEY Patented July 3, 1928.

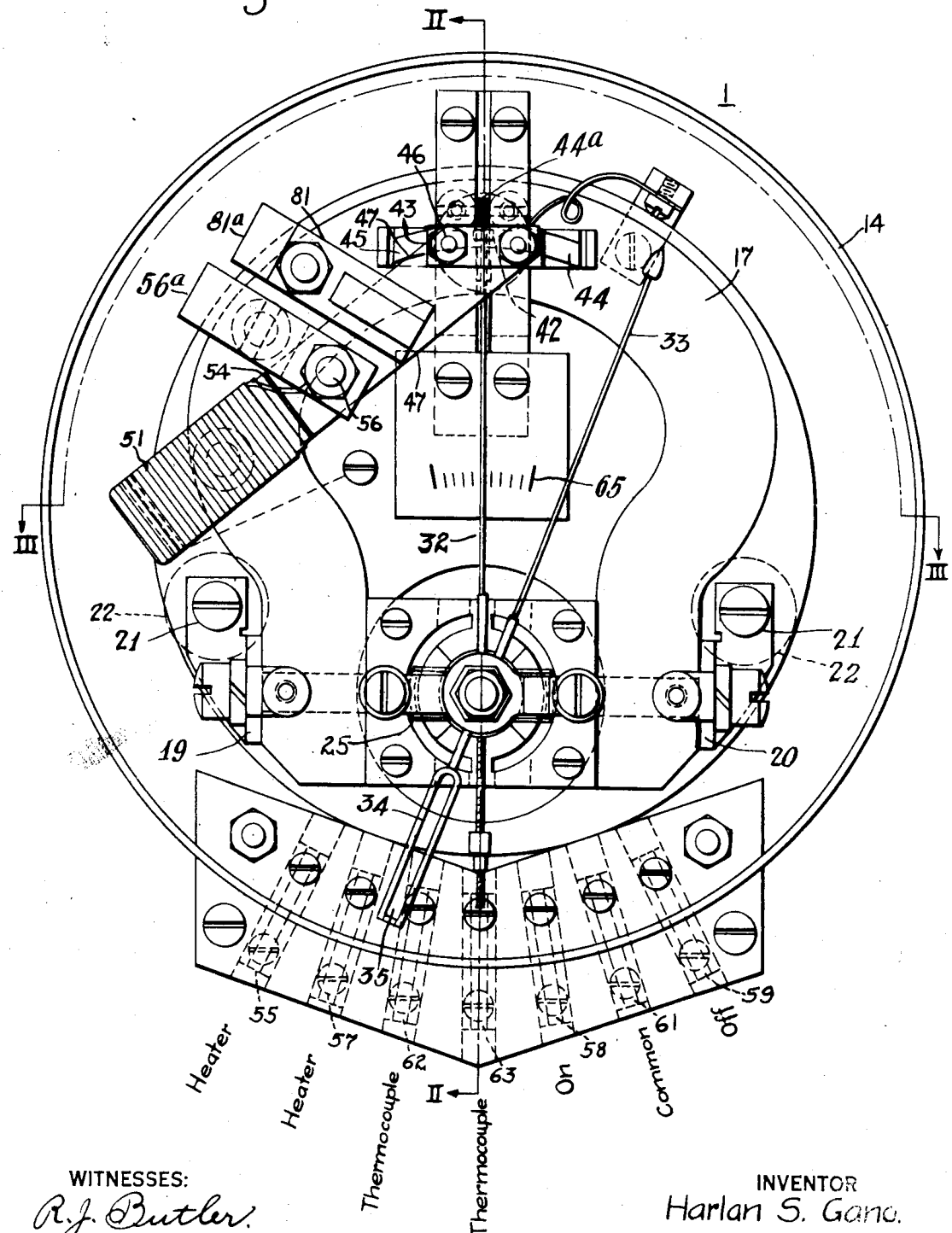

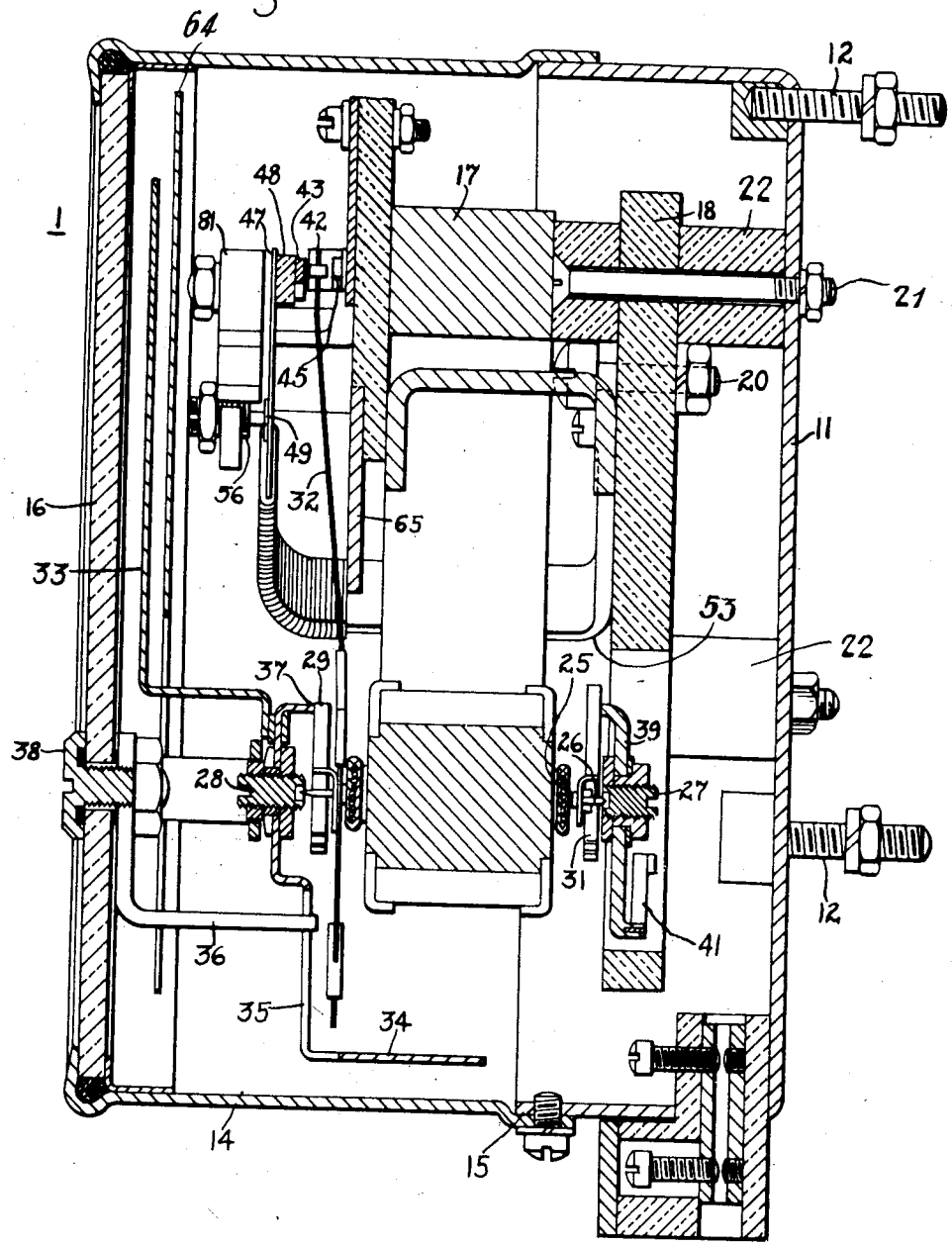

1,675,340

UNITED STATES PATENT OFFICE.

HARLAN S. GANO, OF WILKINSBURG, PENNSYLVANIA, ASSIGNOR TO WESTINGHOUSE ELECTRIC & MANUFACTURING COMPANY, A CORPORATION OF PENNSYLVANIA.

THERMAL REGULATOR.

Application filed January 16, 1924. Serial No. 686,690.

My invention relates to regulators and particularly to thermal regulators.

One object of my invention is to provide a regulator that shall periodically select and complete a controlling circuit in accordance with a desired external condition.

It is also an object of my invention to provide a regulator that shall be periodically actuated by the action of a heating winding or coil associated with a bimetallic element.

Another object of my invention is to provide a regulator that shall be capable of calibration over a large range of operating conditions.

A further object of my invention is to provide a regulator that shall be automatically compensated for changes in ambient temperature.

In the accompanying drawings,

Figure 1 is a front elevational view of a regulating device embodying my invention.

Fig. 2 is a sectional view of my regulator taken along the line II—II of Fig. 1.

Fig. 3 is a top view, partially in plan and partially in section, of a regulator embodying my invention, taken along the line III—III of Fig. 1.

Figs. 4 and 5 are plan and elevational views, respectively, of a detail of my invention; and Fig. 6 is a diagrammatic view of circuits and apparatus embodying my invention.

In the several figures of the drawing, similar reference numerals indicate like parts.

As is shown in Fig. 6, my invention comprises, in general, a regulator 1 for the control of a motor-operated switch 2 that is inserted in a supply circuit 3 serving any desired electrical translating device, such as an electrical heater or a valve-operating motor (not shown).

The regulator 1 is controlled by a thermocouple 4 that is inserted in the translating device under control for generating a voltage to provide an indication of the thermal conditions therein.

As shown in Figs. 1, 2 and 3 of the drawings, the regulator 1 comprises a base member 11 provided with suitable supporting bolts 12 and a cover 14 that is secured, as at 15, to the base 11. The cover 14 is provided with a transparent window 16, preferably of glass. A permanent magnet 17 of U-shape is secured to the base 11 by supporting means comprising a base 18, two brackets 19 and 20 for securing the magnet to the base, a plurality of screws 21 extending through the base and through spacing blocks 22 into the base 11.

An armature 25 is mounted between the pole pieces of the magnet 17. As is shown in Fig. 2, the armature 25 is supported by a shaft 26 between bearings 27 and 28. One end of each of two coil springs 29 and 31 is attached to the armature 25 for purposes to be hereinafter described. A pointer 32 is rigidly secured to the armature 25 and also serves as a connector between the spring 29 and the armature 25.

A second pointer 33 is secured to the bearing 28 and is provided with a tail piece 34 having a slot 35 for receiving a calibrating lever 36. The other end of the spring 29 is secured, as at 37, to the tail piece 34. An adjusting screw 38 is inserted in the glass cover 16 for the operation of the calibrating lever 36 to adjust the initial bias of the armature 25. The bias is a minimum when the pointer 33 is in the position illustrated in Fig. 1, and it may be noted that the scale readings will extend from left to right.

The other end of the spring 31 is secured to a lever 39 that is mounted on the bearing 27 and its movement is controlled by a bimetallic member 41 in response to changes in the ambient temperature.

The end of the pointer 32 is provided with a contact member 42 that is insulated therefrom. As is shown in Fig. 3, the contact member 42 is adapted to move between a contactor bar 43 and a pair of stationary contact members 44 and 45 that are the terminals of external control circuits. The contactor bar 43 is provided with a pair of terminals 46 in order to preserve its position relative to its support, although a single terminal is sufficient for the operation of the device, a bar 44a, of electric-insulating material, is located between the members 44 and 45, and its upper surface is located in the same plane as those of the members 44 and 45.

The contactor bar 43 is carried by a steel bar 47, but is insulated therefrom, as at 48. As is shown in Figs. 4 and 5, the steel bar 47 carries a contact member 49 that is a terminal for a heating coil 51 that surrounds a bimetallic element 52, of L-shape. The bimetallic element, in turn, is supported by a bracket 53 that is mounted on the base 18. The steel bar 47 is welded, as at 54, to the bimetallic element 52 so that a unitary structure is formed comprising the bar 47, bimetallic member 52 and heating coil 51. A suitable conductor connects the other end of the heating coil 51 to a terminal 55 that is mounted on the base 11. The structure shown in Figs. 4 and 5 may be termed a beater or depressor element.

As shown in Fig. 6, the contact member 49 co-operates with a stationary contact member 56 supported by a bracket 56a, that is connected to an external terminal 57 through a resistor 50 (see Fig. 6), for completing the circuit to the heating coil 51. This circuit will hereinafter be referred to as the "heating circuit."

The stationary contact member 45 is connected in circuit with a terminal 58, and the stationary contact member 44 is in circuit with a terminal 59, while the contactor bar 43 is electrically connected to a terminal 61. As is shown in Fig. 1, the terminals 58 and 59 are marked with the indicia "on" and "off," respectively, for a purpose to be hereinafter described. The armature 25 is connected to terminals 62 and 63 that are in circuit with the thermo-couple 4.

As is shown in Fig. 2, a scale 64 is provided for co-operation with the pointer 33, and a second scale 65 is provided for co-operation with the pointer 32. The scale 64 is for the major calibration of the instrument, while the scale 65 is for indicating the deviations of the regulator from the calibrated setting due to changes in the thermal condition of the thermo-couple 4. The scale 65 may be marked in degrees of angular movement, degrees of temperature, or any other desired characters.

As is shown in Fig. 6, the motor-operated switch 2 comprises a motor 71 that is mechanically connected, as at 72, to a pivoted blade 73 for completing a circuit between a pair of contact terminals 74, of like polarity, and the one or the other of contact terminals 75 and 76. The motor 71 is connected from one of the conductors of the circuit 3, through the terminal 61, to the contactor bar 43 in such manner that, upon the completion of a circuit from the contact bar 43 to either of contact members 44 and 45, a circuit is completed to the opposite conductor of the circuit 3 and the motor 71 is actuated. The terminal 59 is in circuit with the stationary contact member 76 and one of the conductors of the circuit 3 beyond the snap switch 2, while the terminal 58 is in circuit with the stationary contact member 75. The stationary contact members 74 are connected to the same conductor of the supply circuit 3 on the supply side of the switch 2 so that only one conductor is connected through the switch 2.

As is shown in Figs. 1 and 2, a permanent magnet 81, supported by a bracket 81a, is mounted directly above the steel bar 47 in such manner that the latter acts as an armature member therefor.

In the operation of calibrating my regulator, the calibrating screw 38 is turned to move the pointer 33 to the proper position relative to the scale 64, thereby placing the spring 29 under tension and giving a predetermined bias to the position of the pointer 32. The position of the pointer 33 should be such that the contactor 42 is held in the mid-position of the scale 65 under normal operating conditions of the thermo-couple 4, that is when the temperature of the apparatus controlled by the regulator is at a predetermined normal temperature.

The instrument having been calibrated or adjusted for the temperature that it is desired to maintain, the circuit through the heater 51 is completed, whereupon the bimetallic element 62 becomes energized and warps in a characteristic manner. The L-shaped bimetallic strip 52 is so designed that the warping action tends to shorten its curve, thereby tending to move the steel bar 47 away from the magnet 81. However, the presence of the magnet 81 insures that the steel bar 47 will not move until the bimetallic member 52 has become energized to a predetermined degree, thereby preventing a "chattering" action when the bimetallic member approaches its critical operating thermal condition for interrupting the heating circuit. As is shown in Figs. 2 and 6, the initial operation of the bimetallic member 52 interrupts its heating circuit. This circuit is again completed when the steel bar 47 returns to its original position by reason of the change in condition of the bimetallic member 52 under the influence of the magnet 81. This movement continues periodically so long as the circuit 3 is energized.

Upon the completion of the circuit between the thermo-couple 4 and the armature 25, the pointer 32 assumes a position between the contactor bar 43 and the stationary contact members 44 and 45, dependent upon the counter-bias of the springs 29 and 31, and the potential of the thermo-couple 4. It is to be observed that, by reason of the bimetallic element 41, the tension of the spring 31 is constantly varied as the temperature of the regulator 1 varies, thereby eliminating any error due to change in the thermal condition of the regulator itself.

As the steel bar 47 is moved upward and downward, as heretofore described, the movable contactor 42 is clamped between the contactor bar 43 and the one or the other of the stationary contact members 44 and 45 depending upon the deflection of the pointer 32, thereby completing one of the external control circuits to the motor-operated switch 2.

In the event that the movable contact member 42 is clamped midway between the stationary contact members 44 and 45 and against the member 44ª, no movement of the motor-operated switch 2 takes place. It is obvious that the most desirable operation of the regulator takes place when it is so adjusted that the electro-motive force from the thermo-couple 4 maintains the contactor 42 in this dead zone.

Upon the completion of a circuit between the contactor 43 and the stationary contact member 44, a circuit is completed that extends from one of the conductors of the circuit 3, through the motor 71 to the terminal 61, the contact bar 43. the movable contact member 42, stationary contact member 44, stationary contact member 76 and the blade 73 to the stationary contact member 74, whereupon the blade 73 is actuated to interrupt that portion of the circuit 3 extending beyond the switch 2. So long as the position of the contactor 42 remains above the stationary contact member 44, the translating device supplied by the circuit 3 remains in the de-energized position for the reason that the blade member 73 does not complete a circuit through the switch 2. This position of the contactor 42 corresponds to a cooling-off period in the translating device.

However, when the position of the movable contact member 42 changes so that a circuit is completed from the contactor bar 43 to the stationary contact member 45, a circuit is completed that extends from one of the conductors of the circuit 3 through the motor 71, the terminal 61, contactor bar 43, movable contact member 42, stationary contact member 45, the terminal 58, the stationary contact member 75, and the blade 73, to one of the stationary contact members 74, whereupon the motor 71 so rotates the blade 73 that it completes a circuit between one of the stationary contact members 74 and the stationary contact members 76, whereupon energy is supplied to the connected translating device.

The movement of the blade 73 interrupts the circuit between one of the stationary contact members 74 and the stationary contact member 75 so that repeated completion of the circuit between the contactor bar 43 and stationary contact member 45 causes no change in the position of the motor-operated switch 2. The above-described cycle of operations is repeated as often as the position of the contactor 42 is shifted relatively to the contact members 44 and 45.

It is to be understood that, while I have shown a motor-operated snap switch 2 as controlled by my regulator 1, any suitable electrical apparatus may be substituted therefor and that the motor-operated snap switch is shown merely by way of illustration of the application of my regulator 1 to control operations.

It will be observed that the position of the indicator 32 changes with respect to the stationary contact members 44 and 45 in response to changes in the thermal condition of the thermo-couple 4 so that the above-described cycle of operations is repeated indefinitely and, accordingly, my regulator is entirely automatic in its operation.

It will thus be seen that I have provided a regulator that is controlled by the action of a bimetallic element in combination with a heating coil, the bimetallic element periodically causing an indicator, the position of which corresponds to the thermal condition in the thermo-couple 4, to select and complete a controlling circuit.

It is to be understood that various changes and modifications may be made in the assembly and arrangement of the several features of my invention without departing from the spirit and scope of the appended claims.

I claim as my invention:

1. In an indicating instrument, a scale, a pointer for co-operation therewith, a tensioning device controlled by said pointer, a second pointer attached directly to said tensioning device, electrically controlled means for actuating the second pointer in accordance with an external condition and in opposition to the bias of said tensioning device, and means for manually actuating said first pointer to calibrate the instrument.

2. In an indicating instrument, a scale, a pointer for co-operation therewith, a tensioning device for biasing said pointer in a predetermined direction, means responsive to an external condition for actuating said pointer in opposition to the bias of said tensioning device, a second pointer secured to said tensioning device, and a second scale for co-operation with said last named pointer, whereby the last named pointer may be so adjusted that the first named pointer is moved to a fixed position relative to the first named scale for different values of said external condition.

3. In an indicating instrument, terminal members for a series of incomplete circuits, a movable contact member, means for actuating said movable contact member in accordance with an external condition, means for initially adjusting said movable contact member, and a bimetallic member for engaging and causing said movable contact member to periodically select and complete one of said circuits.

4. In an indicating instrument, terminal members for a series of incomplete circuits, a pointer, a movable contact member mounted thereon, means for actuating said movable contact member in accordance with an external condition, means for initially adjusting said movable contact member, and a thermally-actuated member for engaging said pointer and causing said movable contact member to periodically select and complete one of said circuits.

5. In an indicating instrument, a scale, a pointer for co-operation therewith, a tensioning device controlled by said pointer, a second pointer attached to said tensioning device, means for actuating the second pointer in accordance with an external condition and in opposition to the bias of said tensioning device, and means for manually actuating said first pointer to calibrate the instrument.

6. In a regulator, in combination, a movable contact member, means for moving said contact member in response to an external condition, a plurality of stationary contact members for a plurality of control circuits, adapted to be engaged by said movable contact member and having means for limiting the movement thereof, and thermally controlled means for directly operatively engaging said movable contact member and causing it to selectively engage one of said stationary contact members for completing one of said control circuits.

7. In an indicating instrument, in combination, a scale, a pointer for cooperation therewith, a tensioning device controlled by said pointer, a plurality of stationary contact members for a plurality of incomplete circuits, a second pointer mounted on said tensioning device and having a contact member mounted thereon, means for actuating the second pointer in accordance with an external condition and in opposition to the bias of said tensioning device, means for causing the contact member on the second pointer to periodically selectively engage said stationary contact members to permit an energizing current to traverse said pointer, contact member and a stationary contact member of one of said circuits, and means for manually operating said first pointer to calibrate the instrument.

In testimony whereof, I have hereunto subscribed my name this 10th day of January 1924.

HARLAN S. GANO.